United States Patent
Choi et al.

(10) Patent No.: US 12,087,934 B2
(45) Date of Patent: Sep. 10, 2024

(54) METHOD OF PRODUCING NEGATIVE ELECTRODE ACTIVE MATERIAL FOR SECONDARY BATTERY, NEGATIVE ELECTRODE FOR SECONDARY BATTERY, AND LITHIUM SECONDARY BATTERY INCLUDING THE SAME

(71) Applicant: LG ENERGY SOLUTION, LTD., Seoul (KR)

(72) Inventors: Hee Won Choi, Daejeon (KR); Je Young Kim, Daejeon (KR); Sang Wook Woo, Daejeon (KR); Li Lin Piao, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 571 days.

(21) Appl. No.: 17/292,248

(22) PCT Filed: Jan. 16, 2020

(86) PCT No.: PCT/KR2020/000835
§ 371 (c)(1),
(2) Date: May 7, 2021

(87) PCT Pub. No.: WO2020/149685
PCT Pub. Date: Jul. 23, 2020

(65) Prior Publication Data
US 2021/0408520 A1 Dec. 30, 2021

(30) Foreign Application Priority Data
Jan. 18, 2019 (KR) ........................ 10-2019-0006690

(51) Int. Cl.
| | |
|---|---|
| *H01M 4/133* | (2010.01) |
| *C01B 32/21* | (2017.01) |
| *H01M 4/02* | (2006.01) |
| *H01M 4/36* | (2006.01) |
| *H01M 4/587* | (2010.01) |
| *H01M 4/62* | (2006.01) |
| *H01M 10/0525* | (2010.01) |

(52) U.S. Cl.
CPC ............ *H01M 4/133* (2013.01); *C01B 32/21* (2017.08); *H01M 4/366* (2013.01); *H01M 4/587* (2013.01); *H01M 4/625* (2013.01); *H01M 10/0525* (2013.01); *C01P 2004/32* (2013.01); *C01P 2004/61* (2013.01); *C01P 2004/80* (2013.01); *C01P 2006/11* (2013.01); *C01P 2006/40* (2013.01); *H01M 2004/021* (2013.01); *H01M 2004/027* (2013.01)

(58) Field of Classification Search
CPC ...... H01M 4/133; H01M 4/366; H01M 4/587; H01M 2004/021; H01M 2004/027; C01B 32/21; C01P 2004/32; C01P 2004/61; C01P 2006/11
See application file for complete search history.

(56) References Cited

U.S. PATENT DOCUMENTS

| | | |
|---|---|---|
| 2004/0170898 A1 | 9/2004 | Shibuya et al. |
| 2008/0199777 A1 | 8/2008 | Onishi et al. |
| 2009/0214954 A1 | 8/2009 | Onishi et al. |
| 2013/0224598 A1 | 8/2013 | Kameda et al. |
| 2014/0370393 A1 | 12/2014 | Nakai et al. |
| 2016/0006020 A1 | 1/2016 | Tamaki et al. |
| 2017/0179487 A1 | 6/2017 | Takeda et al. |
| 2019/0273248 A1 | 9/2019 | Yamada et al. |
| 2020/0235406 A1 | 7/2020 | Lee et al. |

FOREIGN PATENT DOCUMENTS

| | | | |
|---|---|---|---|
| JP | 2003-346786 A | | 12/2003 |
| JP | 4403327 B2 | | 1/2010 |
| JP | 2012-74297 A | | 4/2012 |
| JP | 2013-197082 | * | 9/2013 |
| JP | 2013-197082 A | | 9/2013 |
| JP | 2013-201125 A | | 10/2013 |
| JP | 2014-187007 A | | 10/2014 |
| JP | 5754098 B2 | | 7/2015 |
| JP | 2016-105396 A | | 6/2016 |
| JP | 2016-111021 A | | 6/2016 |
| JP | 2016-136517 A | | 7/2016 |
| JP | 2017-126426 | * | 7/2017 |
| KR | 10-2004-0087858 A | | 10/2004 |
| KR | 10-2007-0072512 A | | 7/2007 |
| KR | 10-2012-0096898 A | | 8/2012 |
| KR | 10-2013-0113439 A | | 10/2013 |
| KR | 10-2014-0147029 A | | 12/2014 |
| KR | 10-2015-0071451 A | | 6/2015 |
| KR | 10-2018-0017453 A | | 2/2018 |
| KR | 10-2018-0051083 A | | 5/2018 |
| WO | WO 2018/097212 A1 | | 5/2018 |

OTHER PUBLICATIONS

English translation of JP Publication 2017-126426, Jul. 2017.*
English translation of JP Publication 2013-197082, Sep. 2013.*
Extended European Search Report for European Application No. 20741909.4, dated Nov. 5, 2021.
International Search Report (PCT/ISA/210) issued in PCT/KR2020/000835 mailed on Apr. 28, 2020.

* cited by examiner

*Primary Examiner* — Brittany L Raymond
(74) *Attorney, Agent, or Firm* — Birch, Stewart, Kolasch & Birch, LLP

(57) ABSTRACT

A negative electrode for a secondary battery including: a negative electrode current collector; and a negative electrode active material layer present on the negative electrode current collector. The negative electrode active material layer includes a negative electrode active material, wherein the negative electrode active material for a secondary battery includes natural graphite, and has a sphericity of 0.58 to 1, a tap density of 1.08 g/cc to 1.32 g/cc, and $D_{max}-D_{min}$ of 16 μm to 19 μm, wherein $D_{max}-D_{min}$ is a difference between a maximum particle diameter $D_{max}$ and a minimum particle diameter $D_{min}$ in a particle size distribution.

10 Claims, No Drawings

METHOD OF PRODUCING NEGATIVE ELECTRODE ACTIVE MATERIAL FOR SECONDARY BATTERY, NEGATIVE ELECTRODE FOR SECONDARY BATTERY, AND LITHIUM SECONDARY BATTERY INCLUDING THE SAME

CROSS-REFERENCE TO RELATED APPLICATIONS

This application is based on and claims the benefit of priority to Korean Patent Application No. 10-2019-0006690, filed on Jan. 18, 2019 in the Korean Intellectual Property Office, the disclosure of which is incorporated herein in its entirety by reference.

TECHNICAL FIELD

The present invention relates to a method of producing a negative electrode active material for a secondary battery, a negative electrode for a secondary battery, and a lithium secondary battery including the same.

BACKGROUND ART

As the price of energy sources rises due to exhaustion of fossil fuel and a concern for environmental pollution is greatly increased, an environmentally friendly alternative energy source becomes an essential factor for future life.

In particular, as technology development and a demand for a mobile device are increased, the demand for a secondary battery as an environmentally friendly alternative energy source is rapidly increased.

In the secondary battery, a lithium metal was originally used as a negative electrode, but as battery short circuit due to formation of dendrite and an explosion risk therefrom became problematic, use of a carbon-based active material which allows intercalation and deintercalation of lithium ions and maintains structural and electrical properties has come up.

As the carbon-based active material, carbon-based materials in various forms such as artificial graphite, natural graphite, and hard carbon have been applied, and among these, a graphite-based active material which may guarantee the life characteristics of a lithium secondary battery due to excellent reversibility is most widely used. Since the graphite-based active material has a low discharge voltage of −0.2 V relative to lithium, a battery using the graphite-based active material may represent a high discharge voltage of 3.6 V, and thus, provides many advantages in terms of an energy density of a lithium battery.

Among these, particularly, natural graphite represents high output and capacity characteristics relative to other carbon-based active materials, but the natural graphite is subjected to mechanical stress due to its low mechanical strength during electrode rolling, and thus, a side reaction with an electrolyte solution becomes strong and the life characteristics may be deteriorated.

Accordingly, there is currently needed development of natural graphite which may minimize the mechanical stress during electrode rolling to prevent occurrence of a side reaction with an electrolyte solution and a swelling phenomenon and improve the life characteristics.

Japanese Patent Registration No. 4403327 discloses a graphite powder for a negative electrode for a lithium ion secondary battery, but an alternative to the above problems has not been suggested.

RELATED ART DOCUMENT

Patent Document

Japanese Patent Registration No. 4403327

DISCLOSURE OF INVENTION

Technical Problem

An aspect of the present invention provides a negative electrode for a secondary battery which may improve output performance of a negative electrode and prevent a side reaction with an electrolyte solution and a swelling phenomenon to have excellent life characteristics.

Another aspect of the present invention provides a lithium secondary battery including a negative electrode for a secondary battery described above.

Still another aspect of the present invention provides a method of producing a negative electrode active material for a secondary battery, the method being capable of producing a negative electrode active material having a relatively uniform particle size distribution, improving output performance of a negative electrode, and preventing a side reaction with an electrolyte solution and a swelling phenomenon to improve life characteristics.

Technical Solution

According to an exemplary embodiment of the present invention, a negative electrode for a secondary battery includes: a negative electrode current collector; and a negative electrode active material layer present on the negative electrode current collector wherein the negative electrode active material layer comprises a negative electrode active material for a secondary battery, wherein the negative electrode active material for a secondary battery includes natural graphite, and has a sphericity of 0.58 to 1, a tap density of 1.08 g/cc to 1.32 g/cc, and $D_{max}-D_{min}$ of 16 μm to 19 μm, wherein $D_{max}-D_{min}$ is a difference between a maximum particle diameter $D_{max}$ and a minimum particle diameter $D_{min}$ in a particle size distribution.

According to another exemplary embodiment of the present invention, a lithium secondary battery includes: the negative electrode for a secondary battery described above; a positive electrode facing the negative electrode for a secondary battery; a separator interposed between the negative electrode for a secondary battery and the positive electrode; and an electrolyte.

According to still another exemplary embodiment of the present invention, a method of producing a negative electrode active material for a secondary battery includes adjusting a particle size distribution of a scaly natural graphite raw material; granulating the scaly natural graphite raw material having an adjusted particle size distribution to produce granulated natural graphite; and adjusting a particle size distribution of the granulated natural graphite, wherein the negative electrode active material includes the natural graphite, and has a sphericity of 0.58 to 1, a tap density of 1.08 g/cc to 1.32 g/cc, and $D_{max}-D_{min}$ of 16 μm to 19 μm, $D_{max}-D_{min}$ being a difference between a maximum particle diameter $D_{max}$ and a minimum particle diameter $D_{min}$ in a particle size distribution.

Advantageous Effects

The negative electrode for a secondary battery of the present invention includes a negative electrode active material for a secondary battery including natural graphite and having a sphericity, a tap density, and a $D_{max}-D_{min}$ value in specific ranges. Accordingly, the negative electrode may have a higher density, so that output performance may be improved, and simultaneously, mechanical stress to which the negative electrode active material is subjected during electrode rolling may be minimized, and a reaction area with an electrolyte solution may be minimized, so that gas production and swelling phenomenon occurrence may be prevented, and thus, excellent life performance may be expected.

BEST MODE FOR CARRYING OUT THE INVENTION

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode.

Terms used in the present specification are used only in order to describe exemplary embodiments rather than limiting the present invention. Singular forms are intended to include plural forms unless otherwise indicated contextually.

It should be understood that the terms "comprises", "provide", or "have" used in this specification, specify the presence of practiced features, numerals, steps, constitutional elements, or a combination thereof, but do not preclude the presence or addition possibility of one or more other features, numerals, steps, constitutional elements, or a combination thereof.

In the present specification, an average particle diameter ($D_{50}$) may be defined as a particle diameter corresponding to a cumulative volume of 50% in a particle size distribution curve of particles. The average particle diameter ($D_{50}$) may be measured using, for example, a laser diffraction method. By the laser diffraction method, a particle diameter approximately from a submicron range to several millimeters may be measured, and results of high reproducibility and high resolution may be obtained.

Hereinafter, the present invention will be described in detail.

<Negative Electrode for Secondary Battery>

The present invention relates to a negative electrode for a secondary battery, and particularly to a negative electrode for a lithium secondary battery.

Specifically, the present invention relates to a negative electrode for a secondary battery including: a negative electrode current collector; and a negative electrode active material layer being formed on the negative electrode current collector and including a negative electrode active material for a secondary battery, wherein the negative electrode active material for a secondary battery includes natural graphite, and has a sphericity of 0.58 to 1, a tap density of 1.08 g/cc to 1.32 g/cc, and $D_{max}-D_{min}$ of 16 µm to 19 µm, $D_{max}-D_{min}$ being a difference between a maximum particle diameter $D_{max}$ and a minimum particle diameter $D_{min}$ in a particle size distribution.

The negative electrode current collector is not particularly limited as long as it has a high conductivity without causing a chemical change of a lithium secondary battery. For example, as the negative electrode current collector, copper, stainless steel, aluminum, nickel, titanium, baked carbon, copper or stainless steel which is surface treated with carbon, nickel, titanium, silver, and the like, an aluminum-cadmium alloy, and the like may be used.

The negative electrode current collector may have fine unevenness formed on the surface thereon to strengthen a binding force to the negative electrode active material, and may be used in various forms such as a film, a sheet, a foil, a net, a porous body, a foam, and a nonwoven fabric body.

The negative electrode current collector may generally have a thickness of 3 µm to 500 µm.

The negative electrode active material layer is formed on the negative electrode current collector.

The negative electrode active material layer includes the negative electrode active material for a secondary battery.

The negative electrode active material for a secondary battery includes natural graphite. Since the natural graphite represents higher output and capacity characteristics than other carbon-based active material, when a negative electrode active material including the natural graphite is used, excellent output characteristics and excellent capacity characteristics may be implemented. However, the natural graphite has many internal pores, which are clogged during electrode rolling, is subjected to much mechanical stress, and forms a passivation film (SEI film) severely during charging/discharging to have poor cycle swelling performance, as compared with artificial graphite or the like.

Thus, the present inventors repeated studies in order to solve the problems of the negative electrode active material including natural graphite as described above, and as a result, found that a sphericity, a tap density, and a particle size distribution of a negative electrode active material including natural graphite are controlled to specific ranges, thereby improving rolling characteristics so that a desired porosity may be implemented even in the case of rolling with a relatively low nip pressure, thereby minimizing particle breakage during rolling, and a reaction area with an electrolyte solution may be effectively decreased to dramatically improve cycle swelling characteristics.

Specifically, the negative electrode active material for a secondary battery of the present invention has a sphericity of 0.58 to 1, a tap density of 1.08 g/cc to 1.32 g/cc, and $D_{max}-D_{min}$ of 16 µm to 19 µm, $D_{max}-D_{min}$ being a difference between a maximum particle diameter $D_{max}$ and a minimum particle diameter $D_{min}$ in a particle size distribution.

Specifically, the sphericity of the negative electrode active material for a secondary battery may be 0.58 to 1, and preferably 0.76 to 1. When the sphericity is less than 0.58, it is difficult for the negative electrode to have a higher density and the electrode adhesive strength is decreased so that the life characteristics may be deteriorated, which is thus not preferred.

The sphericity may be defined as a value obtained by dividing a circumference of a circle having the same area as a projection image of the negative electrode active material for a secondary battery by a perimeter of the projection image of the negative electrode active material for a secondary battery. Specifically, the sphericity may be defined by the following Equation 1:

$$\text{Sphericity} = \text{(circumference of circle having the same area as projection image of negative electrode active material for secondary battery)}/\text{(perimeter of projection image of negative electrode active material for secondary battery)} \quad \text{[Equation 1]}$$

The sphericity may be measured using a particle shape analyzer, for example, sysmex FPIA3000 (manufactured by Mavern) The sphericity according to the present invention may be defined as an average value for the sphericity of 10 particles arbitrarily selected from the negative electrode active material.

Meanwhile, the tap density of the negative electrode active material for a secondary battery is 1.08 g/cc to 1.32 g/cc, preferably 1.16 g/cc to 1.24 g/cc. When the tap density is less than 1.08 g/cc, it is difficult for the negative electrode to have a higher density and an electrode adhesive strength is decreased so that the life characteristics may be deteriorated, and when the tap density is more than 1.32 g/cc, output characteristics may be decreased, which is thus not preferred.

The tap density may be measured by filling a container with the negative electrode active material for a secondary battery, measuring a final volume obtained by vibrating the container a specific number of times, and calculating an apparent density based on the final volume.

In addition, the negative electrode active material for a secondary battery of the present invention may have, in a particle size distribution, $D_{max}$–$D_{min}$ of 16 μm to 19 μm, preferably 17 μm to 18.5 μm, $D_{max}$–$D_{min}$ being a difference between a maximum particle diameter $D_{max}$ and a minimum particle diameter $D_{min}$.

When $D_{max}$–$D_{min}$ of the negative electrode active material is less than 16 μm, fine powder which has a positive influence on output characteristics and an electrode adhesive strength may be excessively removed to deteriorate the output characteristics and the life characteristics. When $D_{max}$–$D_{min}$ is more than 19 μm, uniformity of a particle size is not good, and when the negative electrode active material is used in the negative electrode, a reaction area with an electrolyte solution may not be sufficiently decreased, so that an effect of improving swelling characteristics is insignificant.

As $D_{max}$-$D_{min}$ in the particle size distribution of the negative electrode active material for a secondary battery of the present invention is adjusted to the above range, the particle size may be uniformized to an appropriate level, and for example, a particle size distribution graph may be formed more sharply. Accordingly, when the negative electrode active material is used, a negative electrode having a higher density may be formed, so that improvement of the output characteristics may be expected, and the negative electrode may be formed at a relatively small thickness to minimize a rolling process of the electrode and minimize a reaction area with an electrolyte solution, and thus, gas production and a swelling phenomenon when operating the negative electrode may be prevented at an excellent level.

In addition, the negative electrode active material for a secondary battery may further include a carbon coating layer formed on the natural graphite.

Since the carbon coating layer may improve the mechanical strength of the natural graphite, and thus, improve the structural stability of the active material, resistance to the mechanical stress to which the natural graphite is subjected during rolling may be improved and the effect of preventing a side reaction with an electrolyte solution may be further improved.

The carbon coating layer may be included at 3.5 wt % to 8 wt %, preferably 4 wt % to 6 wt % based on the total weight of the negative electrode active material for a secondary battery, and within the range, the mechanical strength may be further improved and transfer resistance of lithium may not be excessively increased, which is thus preferred in terms of implement of the output characteristics.

The carbon coating layer may be formed by providing one or more materials selected from the group consisting of coal-tar pitch, rayon, and a polyacrylonitrile-based resin or precursors of the materials on the surface of the natural graphite particles, and then thermally decomposing the material(s). Preferably, the carbon coating layer includes soft carbon, which may be formed by baking and thermal decomposition processes of the coal-tar pitch. The thermal treatment process for forming the carbon coating layer may be carried out at a temperature range of 1,000° C. to 4,000° C. in terms of forming a uniform carbon coating layer and preventing excessive formation of the carbon coating layer.

An average particle diameter ($D_{50}$) of the negative electrode active material for a secondary battery of the present invention may be 8 μm to 16 μm, preferably 10 μm to 14 μm, and when a negative electrode active material having the average particle diameter in such range is used in a positive electrode, the reaction area with an electrolyte solution may be decreased, and thus, the effect of preventing a side reaction with an electrolyte solution may be maximized.

$D_{max}$, $D_{min}$, the average particle diameter ($D_{50}$), and the like may be measured by analyzing a particle size distribution of the negative electrode active material. The particle size distribution may be analyzed using a particle size distribution measuring device such as Mastersizer2000 (manufactured by Malvern).

The negative electrode active material of the present invention as described above may be produced by, for example, a production method including: adjusting a particle size distribution of a scaly natural graphite raw material; granulating the scaly natural graphite raw material having an adjusted particle size distribution; and adjusting the particle size distribution of the granulated natural graphite.

First, a scaly natural graphite raw material which is the raw material of the negative electrode active material of the present invention is prepared, and fine powder and coarse powder are removed to adjust the particle size distribution of the scaly natural graphite raw material. Here, the particle size distribution of the scaly natural graphite raw material may be adjusted by a method of adjusting a particle size distribution of particles, which is well known in the art, for example, filtering. For example, a granularity of the scaly natural graphite raw material may be adjusted so that approximately, the average particle diameter is 100 nm to 400 nm, preferably 200 nm to 300 nm and $D_{max}$–$D_{min}$ is 150 nm to 400 nm, preferably 150 nm to 300 nm, but the present invention is not limited thereto.

When a step of adjusting the particle size distribution of the scaly graphite raw material which is the raw material is performed, natural graphite having a relatively uniform particle size distribution may be produced in the granulation step described later.

Next, the scaly natural graphite raw material having an adjusted particle size distribution is mixed with a binder pitch and agglomerated.

The binder pitch is added for facilitating agglomeration of the scaly natural graphite raw material, and may be at least one selected from the group consisting of petroleum-based pitches and coal-based pitches.

The scaly natural graphite raw material and the binder pitch may be mixed at a weight ratio of 85:15 to 99:1, preferably 90:10 to 97:3.

The granulation of the scaly natural graphite raw material and the binder pitch may be performed at 2,000° C. to 3,000° C., preferably 2,200° C. to 2,800° C., for smooth granulation therebetween.

The granulation of the scaly natural graphite raw material and the binder pitch may be performed while rotating the mixture of the scaly natural graphite raw material and the binder pitch at a speed of 1,000 rpm to 4,000 rpm, preferably 2,000 rpm to 3,000 rpm, for smooth granulation and sufficient agglomeration thereof.

The granulation of the scaly natural graphite raw material and the binder pitch may be performed for 3 hours to hours, preferably 5 hours to 10 hours, for smooth granulation and sufficient agglomeration thereof.

The natural graphite granulated as described above may have, approximately, an average particle diameter ($D_{50}$) of 8 µm to 16 µm, preferably 10 µm to 14 µm, and $D_{max}-D_{min}$ of 10 µm to 35 µm, preferably 14 µm to 26 µm, but the present invention is not limited thereto.

Next, a step of adjusting the particle size distribution of the granulated natural graphite is performed.

Here, the step of adjusting the particle size distribution of the granulated natural graphite may be performed by a method of adjusting a particle size distribution of particles, which is well known in the art such as sieving.

If necessary, a step of forming a carbon coating layer on the natural graphite may be further performed after the step of adjusting the particle size distribution of the granulated natural graphite, and thus, the mechanical strength and the structural stability of the natural graphite may be improved.

The carbon coating layer may be formed by providing one or more materials selected from the group consisting of coal-tar pitch, rayon, and a polyacrylonitrile-based resin or precursors of the materials on the surface of the natural graphite particles, and then thermally decomposing the material(s). Preferably, the carbon coating layer includes soft carbon, which may be formed by baking and thermal decomposition processes of the coal-tar pitch. The thermal treatment process for forming the carbon coating layer may be carried out at a temperature range of 1,000° C. to 4,000° C. in terms of forming a uniform carbon coating layer and preventing excessive formation of the carbon coating layer.

Meanwhile, the negative electrode active material layer may further include one or more additives selected from the group consisting of a binder, a thickener, and a conductive material, in addition to the negative electrode active material for a lithium secondary battery described above.

The binder may be included usually at 1 wt % to 30 wt %, based on the total weight of the negative electrode active material layer, as a component assisting binding of the conductive material, the active material, a negative electrode current collector, and the like.

The binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), sulfonated-EPDM, a styrene-butadiene rubber, a fluororubber, or a combination of two or more thereof.

As the thickener, all thickeners conventionally used in a lithium secondary battery may be used, and as an example, carboxymethylcellulose (CMC) and the like may be used.

The thickener may be included at 1 wt % to 30 wt %, based on the total weight of the negative electrode active material layer.

The conductive material is a component for further improving the conductivity of the negative electrode active material, and may be included at 1 wt % to 30 wt %, based on the total weight of the negative electrode active material layer.

The conductive material is not particularly limited as long as it has conductivity without causing a chemical change in the battery, and for example, graphite such as natural graphite or artificial graphite; carbon black such as acetylene black, ketjen black, channel black, furnace black, lamp black, and thermal black; conductive fibers such as a carbon fiber or a metal fiber; fluorocarbon; metal powder such as aluminum powder and nickel powder; conductive whiskers such as zinc oxide and potassium titanate; conductive metal oxides such as titanium oxide; conductive materials such as polyphenylene derivatives, and the like may be used. Specific examples of commercially available conductive materials include acetylene black series such as products from Chevron Chemical Company, Denka black from Denka Singapore Private Limited, and products from Gulf Oil Company, Ketjen black EC series from Armak Company, Vulcan XC-72 from Cabot Company, Super P from Timcal, and the like.

The negative electrode active material layer may be produced by mixing the negative electrode active material for a lithium secondary battery described above with at least one additive selected from the binder, the conductive material, and the thickener in a solvent to prepare a negative electrode slurry, and applying the negative electrode slurry on the negative electrode current collector and rolling and drying the applied slurry.

The solvent may include water or an organic solvent such as N-methyl-2-pyrrolidone (NMP), and may be used in an amount at which a slurry including the negative electrode active material, and optionally the binder, the conductive material, and the like with the solvent has a preferred viscosity. For example, the solvent may be included in an amount at which a concentration of a solid content including the negative electrode active material for a secondary battery and optionally the binder, the thickener, and the conductive material is 50 wt % to 95 wt %, preferably 70 wt % to 90 wt %.

<Lithium Secondary Battery>

In addition, the present invention provides a lithium secondary battery including the negative electrode for a secondary battery described above.

Specifically, the lithium secondary battery includes: the negative electrode for a secondary battery described above; a positive electrode facing the negative electrode for a secondary battery; a separator interposed between the negative electrode for a secondary battery and the positive electrode; and an electrolyte.

The positive electrode may include a positive electrode current collector and a positive electrode active material layer formed on the positive electrode current collector.

The positive electrode active material layer the positive active material, and optionally a binder, a conductive material.

The positive electrode current collector is not particularly limited as long as it has a conductivity without causing a chemical change in the battery, and for example, stainless steel, aluminum, nickel, titanium, baked carbon, or aluminum or stainless steel which is surface-treated with carbon, nickel, titanium, silver, or the like, may be used.

The positive electrode current collector may generally have a thickness of 3 µm to 500 µm.

The positive electrode active material layer is formed on the positive electrode current collector and includes a positive electrode active material.

The positive electrode active material is a compound capable of reversible intercalation and deintercalation of lithium, and may specifically include a lithium composite metal oxide including one or more metals such as cobalt, manganese, nickel, or aluminum with lithium. More specifically, examples of the lithium composite metal oxide may include lithium-manganese-based oxides (for example, LiMnO$_2$, LiMn$_2$O$_4$, and the like), lithium-cobalt-based oxides (for example, LiCoO$_2$, and the like), lithium-nickel-based oxides (for example, LiNiO$_2$, and the like), lithium-nickel-manganese-based oxides (for example, LiNi$_{1-Y}$Mn$_Y$O$_2$ (wherein 0<Y<1), LiMn$_{2-Z}$Ni$_Z$O$_4$ (wherein 0<Z<2), and the like), lithium-nickel-cobalt-based oxides (for example, LiNi$_{1-Y1}$Co$_{Y1}$O$_2$ (wherein 0<Y1<1), and the like), lithium-manganese-cobalt-based oxides (for example, LiCo$_{1-Y2}$Mn$_{Y2}$O$_2$ (wherein 0<Y2<1), LiMn$_{2-z1}$Co$_{z1}$O$_4$ (wherein 0<Z1<2), and the like), lithium-nickel-manganese-cobalt-based oxides (for example, Li(Ni$_p$Co$_q$Mn$_{r1}$) O$_2$ (wherein 0<p<1, 0<q<1, 0<r1<1, and p+q+r1=1) or Li(Ni$_{p1}$Co$_{q1}$Mn$_{r2}$)O$_4$ (wherein 0<p1<2, 0<q1<2, 0<r2<2, and p1+q1+r2=2), and the like), or lithium-nickel-cobalt-transition metal (M) oxides (for example, Li(Ni$_{p2}$Co$_{q2}$Mn$_{r3}$M$_{S2}$)O$_2$ (wherein M is selected from the group consisting of Al, Fe, V, Cr, Ti, Ta, Mg, and Mo; and p2, q2, r3, and s2 are atomic fractions of each independent element, and 0<p2<1, 0<q2<1, 0<r3<1, 0<s2<1, p2+q2+r3+s2=1), and the like), and the like, and any one or two or more compounds thereof may be included. Among these, the lithium composite metal oxide may be LiCoO$_2$, LiMnO$_2$, LiNiO$_2$, a lithium nickel manganese cobalt oxide (for example, Li(Ni$_{0.6}$Mn$_{0.2}$Co$_{0.2}$) O$_2$, Li(Ni$_{0.5}$Mn$_{0.3}$Co$_{0.2}$) O$_2$, or Li(Ni$_{0.8}$Mn$_{0.1}$Co$_{0.1}$) O$_2$, and the like), or a lithium nickel cobalt aluminum oxide (for example, Li(Ni$_{0.8}$Co$_{0.15}$Al$_{0.05}$)O$_2$, and the like), and the like, in terms of increasing the capacity characteristics and safety characteristics of the battery.

The positive electrode active material may be included at 80 wt % to 99 wt %, based on the total weight of the positive electrode active material layer.

The positive electrode active material layer may optionally further include at least one additive selected from the group consisting of a binder and a conductive material, in addition to the positive electrode active material described above.

The binder is a component assisting a binding of the active material, the conductive material, and the like and a binding with the current collector, and is usually added at 1 to 30 wt %, based on the total weight of the positive electrode active material layer. Examples of the binder include polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), sulfonated-EPDM, a styrene-butadiene rubber, a fluororubber, various copolymers, and the like.

The conductive material is not particularly limited as long as it has conductivity without causing a chemical change in the battery, and for example, graphite; carbon-based materials such as carbon black, acetylene black, ketjen black, channel black, furnace black, lamp black, and thermal black; conductive fibers such as a carbon fiber or a metal fiber; metal powder such as fluorocarbon, aluminum, and nickel powder; conductive whiskers such as zinc oxide and potassium titanate; conductive metal oxides such as titanium oxide; conductive materials such as polyphenylene derivatives, and the like may be used. Specific examples of commercially available conductive materials include acetylene black series such as products from Chevron Chemical Company, Denka black from Denka Singapore Private Limited, and products from Gulf Oil Company, Ketjen black EC series from Armak Company, Vulcan XC-72 from Cabot Company, Super P from Timcal, and the like.

The conductive material may be included at 1 to 30 wt %, based on the total weight of the positive electrode active material layer.

The positive electrode active material layer may be produced by adding the positive electrode active material, and optionally an additive including the binder and/or the conductive material to a solvent to prepare a positive electrode slurry, and applying the slurry on the positive electrode current collector and rolling and drying the applied slurry.

The solvent may include an organic solvent such as N-methyl-2-pyrrolidone (NMP), and may be used in an amount at which a solution including the positive electrode active material, and optionally the binder, the conductive material, and the like with the solvent has a preferred viscosity. For example, the solvent may be included in an amount at which a concentration of a solid content including the positive electrode active material, and optionally the binder and the conductive material is 50 wt % to 95 wt %, preferably 70 wt % to 90 wt %.

In the lithium secondary battery, the separator separates the negative electrode and the positive electrode and provides a transport passage of lithium ions, and any separator may be used without particular limitation as long as it is usually used as a separator in a lithium secondary battery. In particular, a separator having a low resistance to ion transport of an electrolyte and excellent electrolyte solution impregnation ability, is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more films thereof, may be used. In addition, a common porous nonwoven fabric, for example, a glass fiber having a high melting point, a nonwoven fabric made of a polyethylene terephthalate fiber and the like may be used. In addition, a coated separator containing a ceramic component or a polymer material for securing thermal resistance or mechanical strength may be used, optionally as a monolayer or multilayer structure.

In addition, examples of the electrolyte used in the present invention include organic-based liquid electrolytes, inorganic-based liquid electrolyte, solid polymer electrolytes, gel type polymer electrolytes, solid inorganic electrolytes, molten type inorganic electrolytes, and the like, which may be used in the production of the lithium secondary battery, but are not limited thereto.

Specifically, the electrolyte may include an organic solvent and a lithium salt.

As the organic solvent, any organic solvent may be used without particular limitation as long as it may serve as a medium in which ions involved in the electrochemical reaction of a battery may move. Specifically, as the organic solvent, ester-based solvents such as methyl acetate, ethyl acetate, γ-butyrolactone, and ε-caprolactone; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), ethyl methyl carbonate (EMC), ethylene carbonate (EC), and propylene carbonate (PC); alcohol-based solvents such as ethyl alcohol and isopropyl alcohol; nitriles such as R—CN(R is a C2 to C20 linear, branched, or cyclic hydrocarbon group, and may include a double bond aromatic ring or an ether bond); amides such as dimethylformamide; dioxolane such as 1,3-dioxolane; or sulfolanes, and the like may be used. Among these, a carbonate-based solvent is preferred, and a mixture of cyclic carbonate having a high ion conductivity and a high dielectric constant to increase charge/discharge performance of a battery (for example, ethylene carbonate, propylene carbonate, or the like) and a linear carbonate-based compound having a low viscosity (for example, ethyl methyl carbonate, dimethyl carbonate, diethyl carbonate, or the like) is more preferred. In this case, when the cyclic carbonate and the chain carbonate are mixed at a volume ratio of about 1:1 to about 1:9 and used, electrolyte solution performance may be excellent.

The lithium salt may be used without particular limitation as long as it is a compound capable of providing a lithium ion used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. It is preferred that a concentration of the lithium salt is in a range of 0.1 M to 2.0 M. When the lithium salt concentration is within the range, the electrolyte has appropriate conductivity and viscosity, so that the electrolyte may exhibit excellent electrolyte performance and lithium ions may effectively move.

As described above, the secondary battery according to the present invention is useful in portable devices such as a mobile phone, a notebook computer, and a digital camera, electric vehicle fields such as a hybrid electric vehicle (HEV), and the like, and in particular, may be preferably used as a configuration cell of a mid-large battery module. Accordingly, the present invention also provides a mid-large battery module including the secondary battery as described above as a unit cell.

The mid-large battery module may be preferably applied to a power source requiring a large output and a large capacity such as an electric vehicle, a hybrid electric vehicle, and an electric power storage apparatus.

Hereinafter, the Examples of the present invention will be described in detail so as to be easily practiced by a person with ordinary skill in the art to which the present invention pertains. However, the present invention may be implemented in various different forms and is not limited to the embodiments provided in the present description.

EXAMPLES

Example 1 Production of Negative Electrode for Secondary Battery

<Production of Positive Electrode Active Material for Secondary Battery>

A scaly natural graphite raw material was prepared, and fine powder and coarse powder were removed by filtering to adjust the particles to have an average particle diameter ($D_{50}$) of 250 nm and $D_{max}-D_{min}$ of 200 nm. The scaly natural graphite raw material and a binder pitch (petroleum pitch) were mixed at a weight ratio of 95:5, rotated at 2,500° C. at 2,500 rpm for 8 hours, and agglomerated and granulated, thereby producing granulated natural graphite (average particle diameter ($D_{50}$) of 11 μm, $D_{max}-D_{min}=22$ μm).

The granulated natural graphite was subjected to particle sieving to remove fine powder and coarse powder, thereby adjusting a particle size distribution. A coal tar pitch was mixed with the natural graphite having an adjusted particle size distribution, and baked at 2,500° C. to produce a negative electrode active material for a secondary battery having a carbon coating layer of soft carbon formed on the natural graphite. The carbon coating layer of soft carbon was formed at 4.5 wt % based on the total weight of the negative electrode active material for a secondary battery.

The negative electrode active material for a secondary battery was measured to have a sphericity of 0.8, a tap density of 1.2 g/cc, an average particle diameter ($D_{50}$) of 11 μm, and $D_{max}-D_{min}$ of 17.5 μm.

<Production of Negative Electrode for Secondary Battery>

The negative electrode active material for a secondary battery produced above, Super C65 as a conductive material, a styrene butadiene rubber (SBR) as a binder, and carboxymethyl cellulose (CMC) as a thickener were mixed at a weight ratio of 96.6:1:1.3:1.1, and water was added thereto to prepare a negative electrode slurry.

The negative electrode slurry prepared above was applied to a copper current collector, and dried under vacuum at about 130° C. for 10 hours to produce a negative electrode for a secondary battery of Example 1. Here, a loading of the negative electrode was 3.61 $mAh/cm^2$.

Examples 2 to 7 and Comparative Examples 1 to 5

Negative electrode active materials of Examples 2 to 7 and Comparative Examples 1 to 5 were produced in the similar manner to Example 1, except that process conditions during removal of fine powder and coarse powder were adjusted so that the negative electrode active material had the sphericity, the tap density, the average particle diameter ($D_{50}$), and $D_{max}-D_{min}$ as listed in the following Table 1. Next, the negative electrode active materials produced were used to produce the negative electrodes of Examples 2 to 7 and Comparative Examples 1 to 5 in the same manner as in Example 1.

TABLE 1

| Classification | Average particle diameter($D_{50}$) (μm) | Sphericity | Tap density | $D_{max}-D_{min}$(μm) |
|---|---|---|---|---|
| Example 1 | 11 | 0.8 | 1.2 | 17.5 |
| Example 2 | 11 | 1 | 1.2 | 17.5 |
| Example 3 | 11 | 0.6 | 1.2 | 17.5 |
| Example 4 | 11 | 0.8 | 1.3 | 17.5 |
| Example 5 | 11 | 0.8 | 1.1 | 17.5 |
| Example 6 | 11 | 0.8 | 1.2 | 18.8 |
| Example 7 | 11 | 0.8 | 1.2 | 16.2 |
| Comparative Example 1 | 11 | 0.55 | 1.2 | 17.5 |
| Comparative Example 2 | 11 | 0.8 | 1.05 | 17.5 |
| Comparative Example 3 | 11 | 0.8 | 1.35 | 17.5 |
| Comparative Example 4 | 11 | 0.8 | 1.2 | 19.5 |
| Comparative Example 5 | 11 | 0.8 | 1.2 | 15.5 |

The sphericity, the tap density, the average particle diameter ($D_{50}$), and $D_{max}-D_{min}$ of the negative electrode active materials for a secondary battery used in the negative electrodes for a secondary battery of Examples 1 to 7 and Comparative Examples 1 to 5 were measured as follows.

(1) Sphericity

The sphericity of the negative electrode active material for a secondary battery used in the Examples and the Comparative Examples was measured using a particle shape analyzer (sysmex FPIA3000, manufactured by Mavern). The sphericity was represented as an average value for the sphericity of 10 particles arbitrarily selected from the negative electrode active materials for a secondary battery.

The sphericity is defined as a value obtained by dividing a circumference of a circle having the same area as a projection image of the negative electrode active material for a secondary battery by a perimeter of the projection image of the negative electrode active material for a secondary battery, and is specifically defined by the following Equation 1:

Sphericity=(circumference of circle having the same area as projection image of negative electrode active material for secondary battery)/(perimeter of projection image of negative electrode active material for secondary battery) [Equation 1]

(2) Tap Density

A tap density may be measured by filling a container with the negative electrode active material for a secondary battery, measuring a final volume obtained by vibrating the container a 2,000 times, and calculating an apparent density based on the final volume.

(3) Average Particle Diameter ($D_{50}$), $D_{max}-D_{min}$

The average particle diameter ($D_{50}$) and $D_{max}-D_{min}$ were measured by analyzing each particle size distribution of the Examples and the Comparative Examples using a particle size distribution measuring device (Mastersizer 2000, manufactured by Malvern).

EXPERIMENTAL EXAMPLES

<Production of Lithium Secondary Battery>

LiCoO$_2$ as a positive electrode active material, Li-435 (manufactured by Denka) as a conductive material, KF9700 (manufactured by Kureha) as a binder, and BH-730H (manufactured by Zeon) were mixed at a weight ratio of 96.25:1.0:1.5:1.25, water was added thereto to prepare a positive electrode slurry, and the positive electrode slurry was applied on an aluminum foil, which was dried under vacuum and rolled at about 130° C. for 8 hours to produce a positive electrode. Here, the positive electrode was produced so that a loading thereof was 3.61 mAh/cm$^2$.

A polyolefin separator was interposed between each of the negative electrodes produced in Examples 1 to 7 and Comparative Examples 1 to 5 and the positive electrode, and an electrolyte solution in which 1 M LiPF$_6$ was dissolved in a nonaqueous electrolyte solvent of ethylene carbonate (EC) and ethyl methyl carbonate (EMC) mixed at a volume ratio of 1:4, was injected to produce lithium secondary batteries of the Examples and the Comparative Examples.

Experimental Example 1: Evaluation of Swelling

The lithium secondary batteries of Examples 1 to 7 and Comparative Examples 1 to 5 produced above were charged and discharged in a charge range of SOC 0 to SOC 95, with a first cycle of 0.1 C, a second cycle of 0.2 C, and a third cycle to a 1030th cycle of 0.5 C. Thereafter, a swell ratio was measured by the following Equation 1:

Swelling ratio (%)={($d_2-d_1$)/$d_1$}×100 [Equation 1]

wherein $d_1$ is a thickness of a negative electrode for a secondary battery before performing a first charge/discharge cycle, and $d_2$ is a thickness of a negative electrode for a secondary battery after performing a 30th charge/discharge cycle.

TABLE 2

|  | Swelling ratio(%) |
| --- | --- |
| Example 1 | 21.0 |
| Example 2 | 21.3 |
| Example 3 | 21.6 |
| Example 4 | 22.1 |
| Example 5 | 22.5 |
| Example 6 | 23.8 |
| Example 7 | 24.7 |
| Comparative Example 1 | 32.3 |
| Comparative Example 2 | 34.7 |
| Comparative Example 3 | 33.2 |
| Comparative Example 4 | 37.6 |
| Comparative Example 5 | 38.5 |

Referring to Table 2, the negative electrodes for a secondary battery and the lithium secondary batteries including the negative electrode active materials for a secondary battery of the Examples satisfying the ranges of the tap density, the sphericity, and $D_{max}-D_{min}$ of the present invention had excellent resistance to mechanical stress, and a minimized reaction area with an electrolyte solution, and thus, it is confirmed that gas production and a swelling phenomenon were prevented to an excellent level during operation of the negative electrode, as compared with the Comparative Examples.

Experimental Example 2: Evaluation of Output

Output characteristics of the secondary batteries of Examples 1 to 7 and Comparative Examples 1 to 5 produced above were evaluated. The output characteristics were evaluated by setting the secondary batteries of the Examples and the Comparative Examples at SOC 50 according to a hybrid pulse power characterization (HPPC) test, and measuring an output resistance at room temperature (25° C.).

Specifically, the secondary batteries were charged and discharged for three cycles in a condition of discharging at 2.5 V and charging at 4.2 V at 0.33 C. Thereafter, the batteries were charged to 2.5 C (10 minutes), stopped (30 minutes), discharged to 2.5 C (10 minutes), and stopped (30 minutes), from the state of being discharged to SOC 50, and a voltage change during charging/discharging was divided by the applied current to measure the output resistance.

TABLE 3

|  | Output resistance(Ohm) |
| --- | --- |
| Example 1 | 0.85 |
| Example 2 | 0.87 |
| Example 3 | 0.90 |
| Example 4 | 0.94 |
| Example 5 | 0.97 |
| Example 6 | 1.01 |
| Example 7 | 1.03 |
| Comparative Example 1 | 1.45 |
| Comparative Example 2 | 1.42 |
| Comparative Example 3 | 1.38 |
| Comparative Example 4 | 1.67 |
| Comparative Example 5 | 1.75 |

Referring to Table 3, it is confirmed that the negative electrodes for a secondary battery and the lithium secondary batteries including the negative electrode active materials for a secondary battery of the Examples satisfying the ranges of the tap density, the sphericity, and $D_{max}-D_{min}$ of the present invention had higher energy densities and output characteristics than the Comparative Examples.

The invention claimed is:

1. A negative electrode for a secondary battery, comprising:
a negative electrode current collector; and
a negative electrode active material layer present on the negative electrode current collector,
wherein the negative electrode active material layer comprises a negative electrode active material,
wherein the negative electrode active material comprises natural graphite, and has a sphericity of 0.58 to 1, a tap density of 1.08 g/cc to 1.32 g/cc, and $D_{max}-D_{min}$ of 16 μm to 19 μm,
wherein the negative electrode active material has an average particle diameter ($D_{50}$) of 8 μm to 16 μm, and
wherein $D_{max}-D_{min}$ is a difference between a maximum particle diameter $D_{max}$ and a minimum particle diameter $D_{min}$ in a particle size distribution.

2. The negative electrode for the secondary battery according to claim 1, wherein the negative electrode active material has the sphericity of 0.76 to 1.

3. The negative electrode for the secondary battery according to claim 1, wherein the negative electrode active material has the tap density of 1.16 g/cc to 1.24 g/cc.

4. The negative electrode for the secondary battery according to claim 1, wherein $D_{max}-D_{min}$ is 17 μm to 18.5 μm.

5. The negative electrode for the secondary battery according to claim 1, wherein the negative electrode active material further comprises a carbon coating layer present on the natural graphite.

6. The negative electrode for the secondary battery according to claim 5, wherein the carbon coating layer comprises soft carbon.

7. The negative electrode for the secondary battery according to claim 5, wherein the negative electrode active material comprises 3.5 wt % to 8 wt % of the carbon coating layer.

8. A lithium secondary battery comprising:
the negative electrode according to claim 1;
a positive electrode facing the negative electrode;
a separator interposed between the negative electrode and the positive electrode; and
an electrolyte.

9. A method of producing a negative electrode active material for a secondary battery, the method comprising:
adjusting a particle size distribution of a scaly natural graphite raw material;
granulating the scaly natural graphite raw material having an adjusted particle size distribution to produce granulated natural graphite; and
adjusting a particle size distribution of the granulated natural graphite;
wherein the negative electrode active material comprises natural graphite, and has a sphericity of 0.58 to 1, a tap density of 1.08 g/cc to 1.32 g/cc, and $D_{max}-D_{min}$ of 16 μm to 19 μm in a particle size distribution,
wherein the negative electrode active material has an average particle diameter ($D_{50}$) of 8 μm to 16 μm, and
wherein $D_{max}-D_{min}$ is a difference between a maximum particle diameter $D_{max}$ and a minimum particle diameter $D_{min}$.

10. The method of producing the negative electrode active material for a secondary battery according to claim 9, further comprising: forming a carbon coating layer on the natural graphite after adjusting the particle size distribution of the granulated natural graphite.

* * * * *